United States Patent
Ravikumar et al.

(10) Patent No.: US 9,440,181 B2
(45) Date of Patent: Sep. 13, 2016

(54) BACK-UP CONFIGURATIONS AND METHOD FOR SULFURIC ACID PLANTS

(75) Inventors: Ravi Ravikumar, Lancaster, CA (US); Richard Bazata, Laguna Niguel, CA (US)

(73) Assignee: Fluor Corporation, Sugar Land, TX (US)

( * ) Notice: Subject to any disclaimer, the term of this patent is extended or adjusted under 35 U.S.C. 154(b) by 604 days.

(21) Appl. No.: 13/885,981

(22) PCT Filed: Nov. 17, 2011

(86) PCT No.: PCT/US2011/061131
§ 371 (c)(1),
(2), (4) Date: Aug. 2, 2013

(87) PCT Pub. No.: WO2012/068336
PCT Pub. Date: May 24, 2012

(65) Prior Publication Data
US 2013/0319225 A1    Dec. 5, 2013

Related U.S. Application Data

(60) Provisional application No. 61/414,676, filed on Nov. 17, 2010.

(51) Int. Cl.
| | | |
|---|---|---|
| *B01D 53/14* | (2006.01) | |
| *C01B 17/60* | (2006.01) | |
| *C01B 17/76* | (2006.01) | |
| *B01D 53/30* | (2006.01) | |
| *B01D 53/50* | (2006.01) | |

(52) U.S. Cl.
CPC ....... *B01D 53/1412* (2013.01); *B01D 53/1481* (2013.01); *C01B 17/60* (2013.01); *C01B 17/76* (2013.01); *B01D 53/30* (2013.01); *B01D 53/507* (2013.01); *B01D 2252/204* (2013.01); *B01D 2257/304* (2013.01); *B01D 2257/504* (2013.01); *Y02P 20/129* (2015.11); *Y02P 20/152* (2015.11)

(58) Field of Classification Search
None
See application file for complete search history.

(56) References Cited

U.S. PATENT DOCUMENTS

| | | | |
|---|---|---|---|
| 3,904,735 A | 9/1975 | Atwood et al. | |
| 4,164,547 A | 8/1979 | Simko | |
| 5,989,313 A | * 11/1999 | Mize | B01D 53/0454 95/10 |

(Continued)

FOREIGN PATENT DOCUMENTS

| | | |
|---|---|---|
| WO | 2009/025003 | 2/2009 |
| WO | 2009025003 | 2/2009 |

OTHER PUBLICATIONS

Cansolv, "State of the Art Gas Absorption Solutions", Cansolv Technologies, Inc., company brochure.

(Continued)

*Primary Examiner* — Duane Smith
*Assistant Examiner* — Phillip Shao
(74) *Attorney, Agent, or Firm* — Conley Rose, P.C.; Kristin Jordan Harkins

(57) ABSTRACT

A sulfuric acid production plant has a discontinuously operating back-up absorber to allow for sulfur emission control in situations where part of or even the entire sulfuric acid production plant is shut down, inoperable, or otherwise compromised. The back-up absorber receives lean solvent from a storage tank that is configured such that continuous operation of the back-up absorber is possible for several hours.

13 Claims, 2 Drawing Sheets

(56) References Cited

U.S. PATENT DOCUMENTS

| | | |
|---|---|---|
| 7,776,296 B2 | 8/2010 | Sarlis |
| 2008/0016972 A1 | 1/2008 | Mudge et al. |
| 2010/0005966 A1 | 1/2010 | Wibberley |
| 2011/0027153 A1* | 2/2011 | Dickson ................ B01D 53/64 423/210 |

OTHER PUBLICATIONS

Leveille, V. et al., "Reducing Sulfuric Acid Plant SO2 Emissions with the Cansolv SO2 Scrubbing System", Cansolv Technologies, Inc., Presented at the 33rd International Phosphate Fertilizer & Sulfuric Acid Technology Conference, Jun. 2009.

Patent Cooperation Treaty, "Notification of Transmittal of International Preliminary Report on Patentability", PCT Application No. PCT/US11/61131, issued Feb. 11, 2013.

Patent Cooperation Treaty, "Notification of Transmittal of the International Search Report and the Written Opinion of the International Searching Authority, or the Declaration", PCT Application No. PCT/US11/61131, issued Mar. 30, 2012.

Roy et al., Use a Cansolve SO2 scrubbing system to better link your batch-operated furnace with its by-product sulphuric acid plant, The Journal of The Southern African Institute of Mining and Metallurgy, vol. 107, pp. 305-313, May 2007.

Tweeddale, Managing risk and realiability of process plants, Gulf Professional Publishing, Amsterdam, ISBN: 0-7506-7734-1, pp. 66-70, 2003.

PCT/US2011/061131 filed Nov. 17, 2011 entitled Back-Up Configurations and Methods for Sulfuric Acid Plants, PCT Search Report & Written Opinion issued Mar. 30, 2012.

PCT/US2011/061131 filed Nov. 17, 2011 entitled Back-Up Configurations and Methods for Sulfuric Acid Plants, International Preliminary Report on Patentability issued Feb. 11, 2013.

* cited by examiner

BACK-UP CONFIGURATIONS AND METHOD FOR SULFURIC ACID PLANTS

This application claims priority to our U.S. provisional application with the Ser. No. 61/414,676, which was filed Nov. 17, 2010.

FIELD OF THE INVENTION

The field of the invention is sulfur emission control, especially as it relates to control of emissions from sulfuric acid plants.

BACKGROUND OF THE INVENTION

Sulfuric acid plants are well known in the art and typically operate with relatively high efficiency. However, most sulfuric acid plants generate a tail gas that has a substantial concentration of SO2 and the tail gas is therefore generally not acceptable for venting into the atmosphere. To reduce SO2 emissions, various processes are known. For example, tail gas can be subjected to a continuous amine absorption process as described in U.S. Pat. Nos. 3,904,735 and 7,776,296. These and all other extrinsic materials presented herein are incorporated by reference in their entirety. Furthermore, where a definition or use of a term in an incorporated reference is inconsistent or contrary to the definition of that term provided herein, the definition of that term provided herein applies and the definition of that term in the reference does not apply.

A typical sulfuric acid plant is exemplarily depicted in Prior Art FIG. 1 where a conventional downstream amine absorber unit removes SO2 from the reactor offgas in a continuous fashion. More specifically, an offgas from a sulfur burner is fed to a sulfuric acid plant, and the catalytic reactor produces sulfuric acid and a tail gas rich in sulfur species (and particularly SO2). The tail gas is typically fed to an amine absorber that operates with a lean solvent to so produce a rich solvent that is subsequently regenerated in a SO2 stripper. The so removed SO2 is recycled to the front end of the plant while the lean solvent is fed back to the amine absorber. Thus, the tail gas can be treated to relatively low levels of SO2. While such configurations often achieve satisfactory results during normal operating conditions, SO2 removal is not achieved when the continuous amine process is interrupted.

To avoid unintended SO2 release into the atmosphere, most plant operators choose one of two common options. In one option, an additional continuous amine absorption system is implemented as a back-up system and only started upon failure of the first system. While such back-up option generally has a large capacity to remove SO2, significant capital cost and low SO2 removal capacity during start-up is commonly encountered. Alternatively, two full-sized sulfuric acid plants can be run in parallel at half capacity. Thus, when the SO2 removal unit of one plant is down, SO2 removal can be achieved by the SO2 removal unit of the other plant. While such option advantageously overcomes difficulties associated with start-up conditions, the substantial cost of installation and operation is often a significant drawback.

Therefore, even though several options for SO2 removal from sulfuric acid plants are known in the art, there is still a need to provide improved back-up systems and methods for sulfur plants.

SUMMARY OF THE INVENTION

The inventive subject matter is directed to configurations and methods in which a discontinuously operating back-up absorber is used to allow for sulfur emission control in sulfuric acid plants where part or the entire plant is shut down, inoperable or otherwise compromised in operation. Most preferably, the back-up absorber will receive lean solvent from a lean solvent storage tank that is dimensioned to allow operation of the sulfuric acid plant or continued delivery of a feed stream into the sulfuric acid plant where the tail gas absorber of the sulfuric acid plant or the entire sulfuric acid plant is not operable or otherwise compromised.

In one preferred aspect of the inventive subject matter, a method of sulfur removal from a sulfuric acid plant feed gas or sulfuric acid plant off gas includes a step of using a sensor or process schedule to determine that a component of the sulfuric acid plant is inoperable, compromised, defective, or scheduled for shut-down. In another step, at least a portion of the feed gas or the offgas is diverted to a discontinuously operating back-up absorber, and the feed gas or offgas is contacted with a lean solvent in the back-up absorber to form a rich solvent. Most preferably, the lean solvent is provided from a lean solvent storage tank that has a capacity sufficient to allow continuous operation of the back-up absorber at the feed rate of the feed gas or off gas for at least two hours.

Therefore, the inventors also contemplate a method of sulfur removal from a sulfuric acid plant feed gas stream in which a sulfuric acid plant feed gas is provided at a first feed rate to a sulfuric acid plant. In another step, at least a portion of the feed gas is diverted to a back-up absorber that is operated in a discontinuous manner with respect to continuous operation of the sulfuric acid plant, and the diverted feed gas is contacted in the back-up absorber with a lean solvent to thereby produce a rich solvent. It is generally preferred that the lean solvent is provided from a lean solvent storage tank, and that the lean solvent storage tank has a capacity sufficient to allow continuous operation of the back-up absorber at the first feed rate for at least two hours.

In further preferred aspects of the inventive subject matter, the rich solvent from the back-up absorber is stored in a rich solvent storage tank, and/or the rich solvent is regenerated in a regenerator. Where desirable or feasible, the regenerator is operated using waste heat from a component of the sulfuric acid plant, and is operated at a time when the back-up absorber does not operate. Alternatively, the regenerator may also be a regenerator of a primary sulfur removal unit of the sulfuric acid plant. Furthermore, it is generally preferred that the regenerator produces a regenerator overhead that is recycled to a location in the sulfuric acid plant.

Thus, and viewed from a different perspective, a back-up sulfur removal system includes a back-up absorber that is fluidly coupled to a component of a sulfuric acid plant that provides an acid gas to a primary absorber of the sulfuric acid plant or to a sulfuric acid plant feed gas source. It is further preferred that a lean solvent storage container is fluidly coupled to the absorber, and that a control system is configured to allow determination that the primary absorber is inoperable, compromised, defective, or shut down, wherein the control system is further configured to allow for discontinuous operation of the back-up absorber upon determination that the primary absorber is inoperable, compromised, defective, or shut down. As noted before, it is generally preferred that the back-up absorber and lean solvent storage container are configured to allow for continuous operation of the back-up absorber at the first or second feed rate for at least two hours, and more preferably at least 10 hours to thereby produce a rich solvent while the primary absorber is inoperable, compromised, defective, or shut down.

In such systems and configurations, it is further preferred that the back-up system further includes a rich solvent storage container to receive and store the rich solvent, and a regenerator that is fluidly coupled to the back-up absorber and/or a rich solvent storage container, wherein the regenerator produces a lean solvent from the rich solvent. Where desirable or feasible, the regenerator uses waste heat from a component of the sulfuric acid plant. Alternatively or additionally, it is contemplated that the lean solvent storage container and/or the regenerator uses a primary sulfur removal system of the sulfuric acid plant. It is still further contemplated that the control system allows for automatic start-up of the back-up absorber upon determination that the primary absorber is inoperable, compromised, defective, or shut down.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

Prior Art

DETAILED DESCRIPTION

Figure 1:
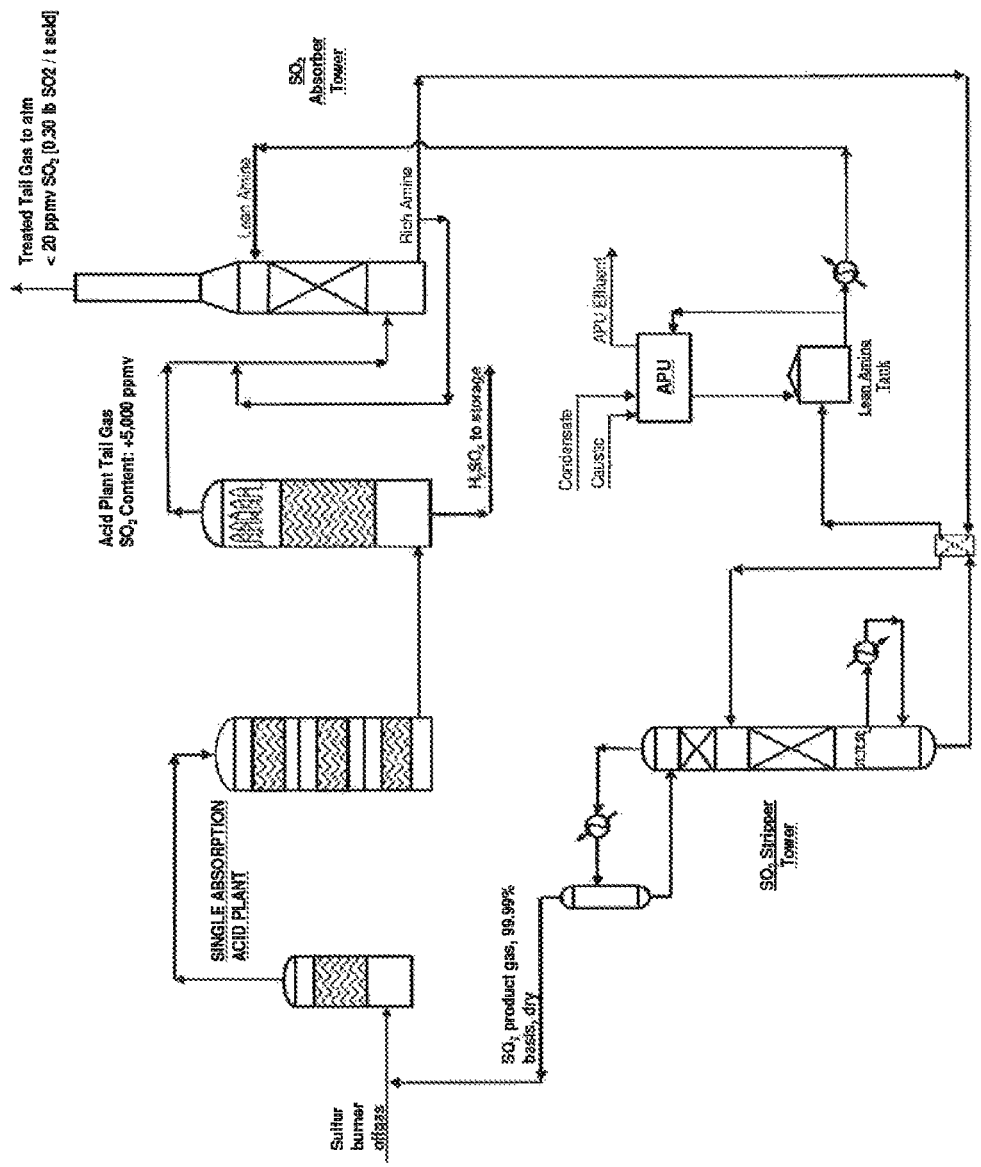
FIG. 1 is a schematic illustration of a known sulfuric acid plant.

The inventors have now discovered that continuous removal of sulfurous components (and especially SO2) from sulfuric acid plants can be realized even when the primary SO2 removal unit is temporarily inoperable. In especially preferred aspects of the inventive subject matter, a back-up amine absorber system is used to receive the tail gas downstream of the last catalytic reactor, wherein the back-up amine absorber system is configured as a discontinuously operating back-up system. Alternatively, or additionally, the back-up absorber may also be coupled to the plant such that the back-up absorber can also receive and process feed gas that is fed into the sulfuric acid plant as a feed gas. Such back-up amine absorber system would preferably be designed to preferentially also remove the H2S in the acid gas.

In preferred aspects, a predetermined quantity of lean solvent for SO2 absorption (e.g., sufficient for 6-8 hours of continuous operation without regeneration) is stored in a storage tank and fed to a back-up absorber in case the primary SO2 removal system is inoperable or otherwise compromised. Rich solvent is then fed to an optional holding tank. Once SO2 absorption using the back-up absorber has been discontinued, the rich solvent is regenerated, preferably in a small regenerator (or main regenerator of the plant), and the lean solvent is recycled back to the lean solvent storage tank (or provided from the solvent circulation of the existing plant).

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Still further, the term "about" when used in conjunction with a numeral refers to the value of that numeral +/−10%, inclusive of the numeral.

Consequently, it is generally preferred that the back-up sulfur removal systems contemplated herein will typically have a back-up absorber that is fluidly coupled to one or more components of a sulfuric acid plant (e.g., catalytic reactor) that provides an acid gas to a primary absorber of the sulfuric acid plant, and/or a sulfuric acid plant feed gas source (e.g., sulfur burner, Claus plant, acid gas removal unit, etc.). In such plants, it is generally preferred that the primary absorber produces an offgas at a first flow rate, and that the sulfuric acid plant feed gas source produces or delivers a feed gas at a second rate. A control system is then provided and coupled to the plant such as to allow a determination that the primary absorber (or other component of the sulfuric acid plant) is inoperable, compromised, defective, or shut down. The control system is further configured to allow for discontinuous operation of the back-up absorber upon (preferably automatic) determination that the primary absorber is inoperable, compromised, defective, or shut down. In especially preferred aspects, the back-up absorber and the lean solvent storage container allow for continuous operation of the back-up absorber at the first or second feed rate for at least two hours to thereby produce a rich solvent while the primary absorber is inoperable, compromised, defective, or shut down.

In one exemplary use and configuration according to the inventive subject matter, the back-up SO2 removal is employed in an emergency situation where the primary acid/sour gas sulfur removal unit is inoperable, or compromised. Here, a low pressure back-up absorber is utilized (typically using an amine solvent) to remove sulfurous compounds from the offgas before flaring/venting the treated gas. Most typically, the quantity of lean solvent in a lean solvent storage tank is projected based on the anticipated outage duration of the primary SO2 removal unit. Rich solvent (H2S, CO2 and amine) from the absorber is then stored on site and stripped in a regenerator, preferably with waste heat available from within the plant, at a reduced rate (relative to the consumption rate of lean solvent) after the primary SO2 removal facility is back on-line. The acid gas from the regenerator is recycled to the sulfuric acid plant to recover the sulfur that was removed by the solvent. Lean solvent is returned to the lean solvent storage tank where it is reused during the next emergency need.

Figure 2:
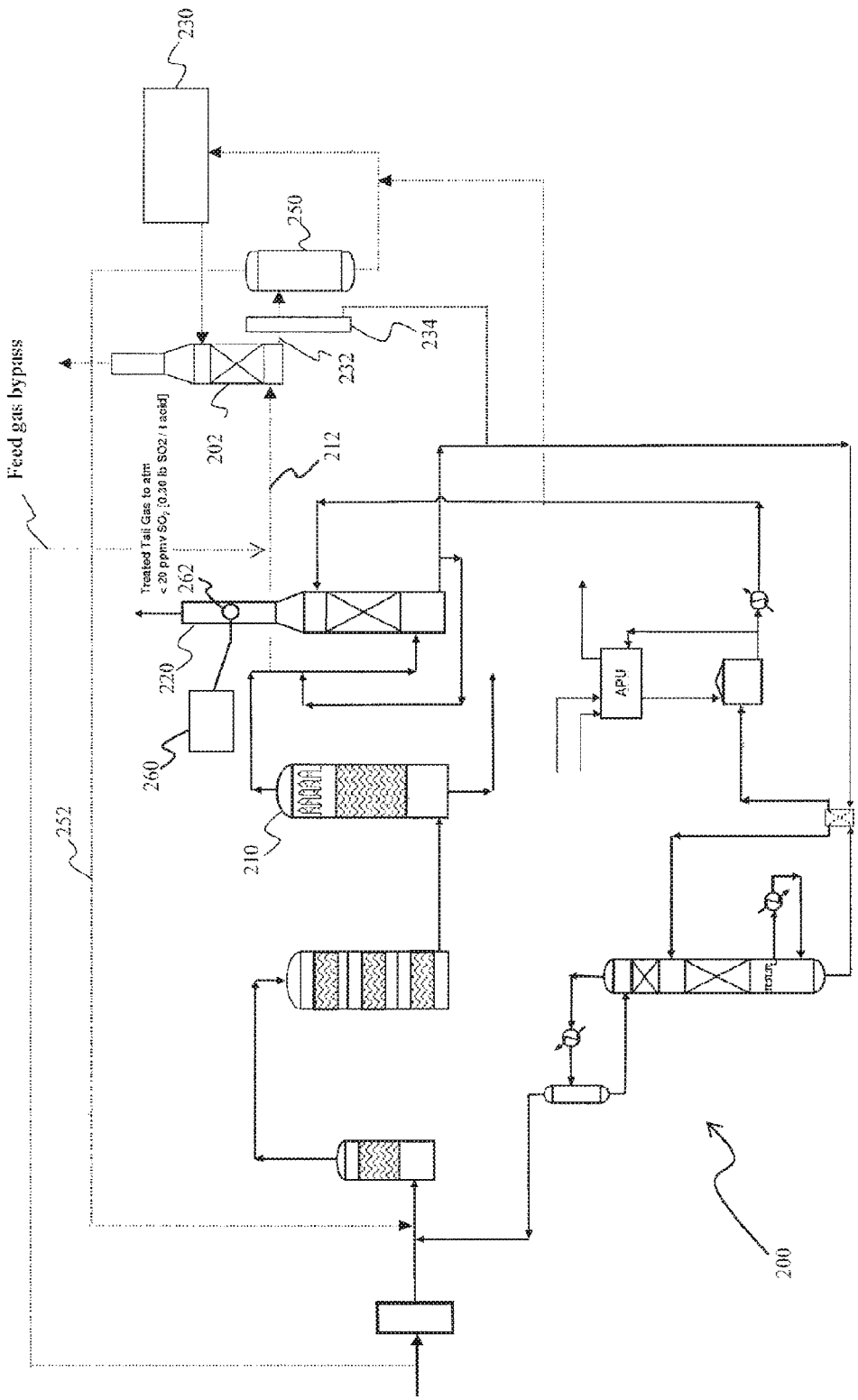
FIG. 2 is an exemplary schematic of a sulfuric acid plant with a back-up sulfur removal system according to the inventive subject matter.

In contrast to configurations of Prior Art FIG. 1, and as shown in more detail below in FIG. 2, a relatively small supplemental amine absorber 202 is coupled to the plant 200 to thus receive the offgas 212 of the second catalytic reactor 210 in the event that the primary absorber 220 is inoperable or otherwise compromised. In that event, lean solvent from lean solvent storage tank 230 is fed to supplemental amine absorber 202 to so treat the offgas 212. Rich solvent 232 is then fed to optional rich solvent storage tank 234, which provides the rich solvent as a feed to supplemental regenerator 250. Supplemental regenerator 250 is most preferably operated using waste heat generated from within the plant, and acid gas 252 that is removed from the rich solvent is recycled to the front end of the plant. It is generally preferred that the switch-over operation to the supplemental amine absorber 202 is performed in an automated manner, typically using a SO2 sensor 262, a control unit 260, and associated control valves (not shown).

Thus, it should be appreciated that one advantage of contemplated configurations and methods is that capital and operating cost are substantially reduced. Lower capital cost is due to low pressure operation of the absorber (the back-up absorber is configured to operate at a pressure of typically between about 15 psia to about 30 psia, between about 30 psia to about 50 psia, or between about 50 psia to about 100 psia), and downsizing of the regenerator as the regenerator operation can be rendered independent of the solvent flow rate of the primary and/or back-up absorber. Such can be achieved either via surge vessel or independent rich solvent storage tank. Moreover, as regeneration of the solvent is also independent of the absorber operation, low pressure waste heat (typically generated from a component located within the sulfuric acid plant) can be used to regenerate the solvent. Still further, it should be noted that the configurations and methods presented herein also allow to reduce or even eliminate aqueous waste disposal, and further allow for recovery of sulfur as a by-product.

Thus, it should be appreciated that instead of providing a second process plant to serve as the backup, configurations and methods presented herein will provide a low cost option to meet regulatory requirements. Such configurations and methods are also useful for applications where the feed gas is not provided by a sulfuric acid plant, but by a plant having a relatively low (e.g., equal or less than 2000 ppm, more typically equal or less than 1000 ppm) content of SO2 in the tail gas (e.g., smelter offgas, anode furnace offgas, sinter plant offgas, low sulfur gasification plants, etc.). Alternatively, such configurations and methods can also serve as a sulfur capture unit for treating sour syngas during upset conditions.

With respect to the back-up amine absorber it is generally contemplated that all known types and configurations of absorbers are deemed suitable so long as the back-up amine absorber has sufficient capacity to remove sulfurous compounds from the offgas to a desirable and/or required level. However, it is generally contemplated that the back-up absorber in at least some cases is smaller than the primary amine absorber, and in most cases will have a capacity of equal or less than 90%, more typically equal or less than 80%, and most typically equal or less than 70% of the primary amine absorber. Likewise, it is generally preferred that the regenerator has a substantially lower capacity that the primary regenerator and in most cases will have a capacity of equal or less than 80%, more typically equal or less than 60%, and most typically equal or less than 50% of the primary regenerator.

Furthermore, it is generally preferred that the back-up amine absorber is operated in a discontinuous manner with respect to continuous operation of the sulfuric acid plant (i.e., will not operate during normal sulfuric acid plant operation), but that the back-up amine absorber is in a stand-by mode. Consequently, continuous solvent circulation is not required and the lean solvent storage tank remains at a predetermined level. However, where desirable, the back-up amine absorber may also be (continuously) operated as a trim absorber. In that case, the back-up amine absorber will receive the offgas from the primary absorber. Regardless of the type of operation, it is generally preferred that the back-up amine absorber receives a stream of lean solvent from the lean solvent storage tank. Where the back-up amine absorber is in stand-by mode, lean solvent will typically not circulate. On the other hand, and especially where the supplemental amine absorber is operated as a trim absorber, lean solvent may be recycled to the lean storage tank until a predetermined level of sulfurous compounds is reached in the lean solvent (which is then regenerated in at least one of the primary and second regenerator).

The lean solvent tank preferably has a capacity that is sufficient for continuous operation of up to 1 hour, more typically of up to 2 hours, even more typically of up to 4 hours, and most typically of up to 8-10 hour. Consequently, the rich solvent storage (or surge) tank will be dimensioned correspondingly. While it is generally preferred that the lean solvent for the lean solvent tank is provided by the secondary regenerator, it is also contemplated that at least part of the lean solvent may also be provided by the primary regenerator during normal operation of the primary sulfur removal facility. Consequently, it should be appreciated that the secondary regenerator shown in FIG. 2 may also be omitted. However, where an independent regeneration is desired, it is typically preferred that heat for regeneration in the regenerator is provided by waste heat available from within the plant. In still further contemplated aspects, the lean amine storage tank (or supplemental storage tank) of the primary sulfur removal facility may be used as source for lean amine solvent. Thus, the lean amine storage tank of the backup system may also be omitted.

Therefore, and in yet another aspect of the inventive subject matter, the back-up sulfur removal system may include only a back-up absorber that receives only on demand lean solvent from a lean solvent tank of the primary sulfur removal, and that feeds rich solvent to a surge vessel from which rich solvent is later fed to the regenerator once the primary sulfur removal facility is back on-line.

Depending on the particular configuration of the back-up system presented herein, it should be noted that the switch-over from primary sulfur recovery to back-up sulfur recovery may be performed in numerous manners. For example, in less preferred aspects, the switch-over may be performed in a manual manner using control valves well known in the art. In more preferred aspects, the switch-over is performed using an automated, and most preferably computer-controlled mechanism that will allow continuous measurement of SO2 and other sulfurous compounds at the outlet of the primary sulfur removal facility. For example, when sulfur concentrations are above a predetermined level in the primary absorber overhead, at least a portion of the flow from the catalytic reactor offgas may be diverted into the back-up absorber, which will then receive lean solvent from the lean solvent storage tank. Rich solvent can then be delivered to the rich solvent storage tank as needed.

Additionally, it should be appreciated that the back-up amine absorber system may receive sulfurous species from any part within and/or even upstream of the sulfuric acid plant. Therefore, continuous operation of the upstream process can be ensured (for at least the capacity of the back-up amine absorber system), and operational upset in the sulfuric acid plant can be compensated for. Most typically, the same components and design considerations as provided above will apply in such scenario. Furthermore, while not preferred, it is contemplated that the back-up amine absorber system may be operated together with the existing acid gas removal system.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of sulfur removal from a sulfuric acid plant feed gas or sulfuric acid plant off gas, wherein the feed gas or offgas is provided at a first flow rate to or from the sulfuric acid plant, respectively, the method comprising:
   using a sensor or process schedule to determine that a component of the sulfuric acid plant is inoperable, compromised, defective, or scheduled for shut-down;
   diverting at least a portion of the feed gas or the offgas to a back-up absorber that is operated in a discontinuous manner with respect to continuous operation of the sulfuric acid plant;
   contacting the at least portion of the feed gas or the offgas with a lean solvent in the back-up absorber to thereby form a rich solvent, wherein the lean solvent is provided from a lean solvent storage tank; and
   wherein the lean solvent storage tank has a capacity sufficient to allow continuous operation of the back-up absorber at the first feed rate for at least two hours.

2. The method of claim 1 further comprising a step of storing the rich solvent from the back-up absorber in a rich solvent storage tank.

3. The method of claim 1 further comprising a step of regenerating the rich solvent from the back-up absorber in a regenerator.

4. The method of claim 3 wherein the regenerator is operated using waste heat from a component of the sulfuric acid plant.

5. The method of claim 3 wherein the regenerator is operated at a time when the back-up absorber does not operate.

6. The method of claim 3 wherein the regenerator is a regenerator of a primary sulfur removal unit of the sulfuric acid plant.

7. The method of claim 3 wherein the regenerator produces a regenerator overhead that is recycled to a location in the sulfuric acid plant.

8. A method of sulfur removal from a sulfuric acid plant feed gas stream, comprising:
   providing a sulfuric acid plant feed gas at a first feed rate to a sulfuric acid plant;
   diverting at least a portion of the feed gas to a back-up absorber that is operated in a discontinuous manner with respect to continuous operation of the sulfuric acid plant; and
   contacting the at least portion of the feed gas with a lean solvent in the back-up absorber to thereby produce a rich solvent, wherein the lean solvent is provided from a lean solvent storage tank; and
   wherein the lean solvent storage tank has a capacity sufficient to allow continuous operation of the back-up absorber at the first feed rate for at least two hours.

9. The method of claim 8 further comprising a step of storing the rich solvent from the back-up absorber in a rich solvent storage tank.

10. The method of claim 8 further comprising a step of regenerating the rich solvent from the back-up absorber in a regenerator.

11. The method of claim 10 wherein the regenerator is operated using waste heat from a component of the sulfuric acid plant.

12. The method of claim 10 wherein the regenerator is operated at a time when the back-up absorber does not operate.

13. The method of claim 10 wherein the regenerator is a regenerator of a primary sulfur removal unit of the sulfuric acid plant.

* * * * *